(12) United States Patent
Richard et al.

(10) Patent No.: US 6,957,004 B2
(45) Date of Patent: Oct. 18, 2005

(54) PASSIVE CONNECTIVITY OF WAVEGUIDES FOR OPTICAL COMPONENTS

(75) Inventors: Jenkin A. Richard, Palo Alto, CA (US); Steven J. Benerofe, San Francisco, CA (US); Eric V. Chamness, Menlo Park, CA (US); George H. Guan, Fremont, CA (US)

(73) Assignee: Oplink Communications, Inc., Fremont, CA (US)

( * ) Notice: Subject to any disclaimer, the term of this patent is extended or adjusted under 35 U.S.C. 154(b) by 235 days.

(21) Appl. No.: 10/138,083

(22) Filed: May 3, 2002

(65) Prior Publication Data

US 2003/0206707 A1 Nov. 6, 2003

(51) Int. Cl.$^7$ .............................. G02B 6/12; G02B 6/10
(52) U.S. Cl. ......................... 385/131; 385/14
(58) Field of Search .......................... 385/93, 129, 132, 385/142, 31, 33–35

(56) References Cited

U.S. PATENT DOCUMENTS

| | | | | |
|---|---|---|---|---|
| 4,346,396 A | * | 8/1982 | Carroll et al. | 257/674 |
| 5,024,366 A | * | 6/1991 | Kim | 228/56.1 |
| 5,259,044 A | * | 11/1993 | Isono et al. | 385/2 |
| 5,271,082 A | | 12/1993 | Braglia et al. | |
| 5,546,212 A | * | 8/1996 | Kunikane et al. | 385/33 |
| 5,656,186 A | | 8/1997 | Mourou et al. | |
| 5,721,426 A | * | 2/1998 | Sakai et al. | 385/33 |
| 6,295,393 B1 | * | 9/2001 | Naganuma | 385/11 |

* cited by examiner

Primary Examiner—Joseph Williams
Assistant Examiner—Peter Macchiarolo
(74) Attorney, Agent, or Firm—Fish & Richardson P.C.

(57) ABSTRACT

A packaged waveguide for passive connectivity includes waveguides packaged in a ferrule. The ferrule allows the waveguides to be passively aligned to other waveguides, fibers, or optical components, such as to align a first waveguide in the ferrule with a laser diode in a BiDi. In the exemplary embodiment, a second waveguide in the ferrule the BiDi is at a known and fixed distance apart from the first waveguide at an end face of the ferrule. A detector in the BiDi may be positioned so that when the first waveguide is aligned with the laser diode, the second waveguide is also aligned with the detector. Additional functions can be provided with the waveguide. The manufacturing of the BiDi with the waveguides packaged in the ferrule is cost efficient to manufacturer since alignment and connectivity is achieved passively. The cost efficiency can be further improved by using standard components.

9 Claims, 4 Drawing Sheets

TOP VIEW

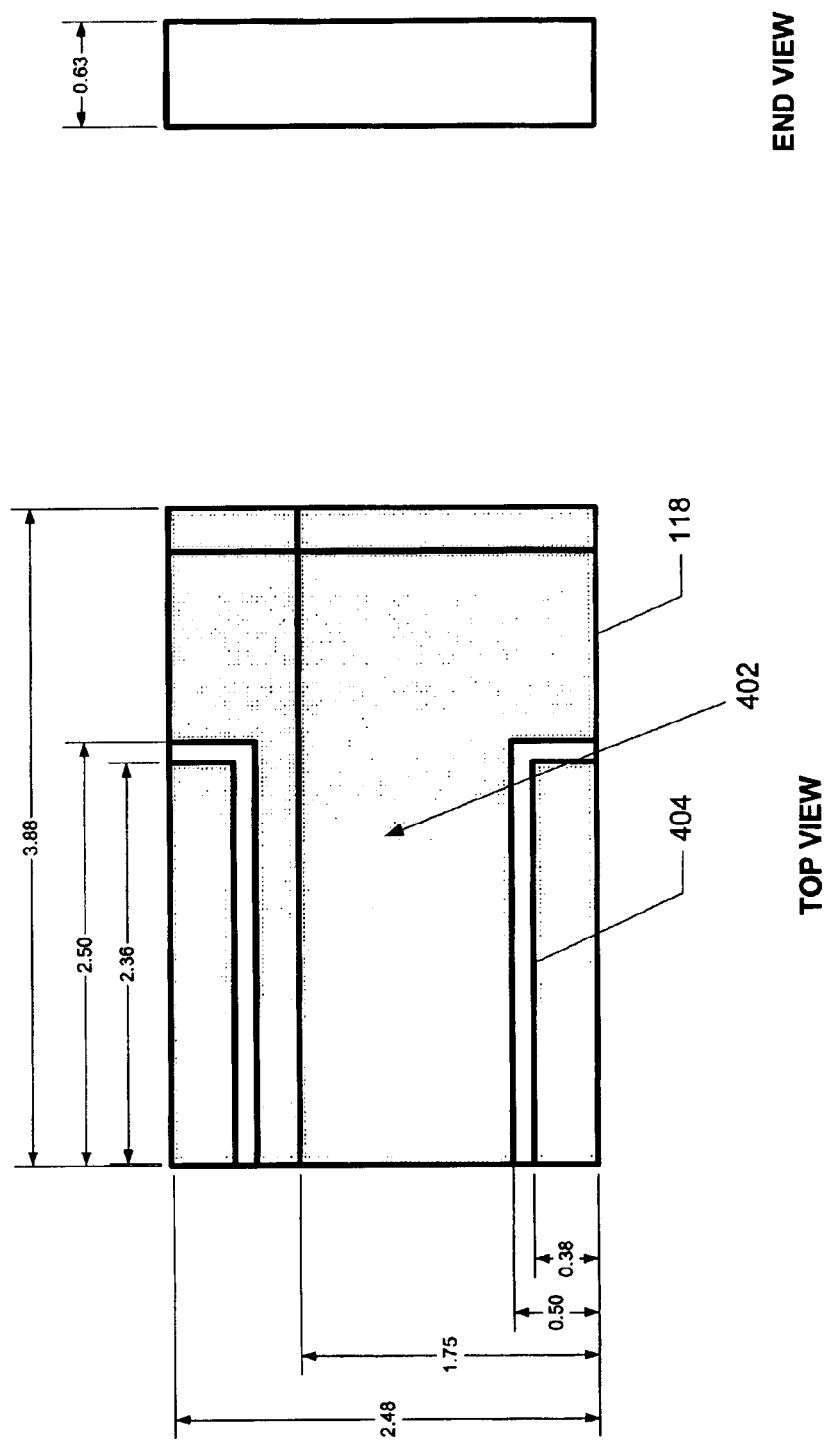

PASSIVE CONNECTIVITY OF WAVEGUIDES FOR OPTICAL COMPONENTS

FIELD OF THE INVENTION

The present invention relates to the connectivity between optical devices, and more particularly to connecting waveguides between optical devices.

BACKGROUND OF THE INVENTION

Bi-Directional optical modules (BiDi) are known in the art. BiDi's are typically optically coupled to another optical component via optical fibers in a ferrule. A "ferrule", as used in this specification, is a component, such as a rigid tube, used to align and protect the stripped end of fibers. The ferrule is typically used with a connector that connects the fibers to other fibers or to an optical component. The ferrule keeps the fibers accurately aligned within the connector. However, a fiber functions as a line in guiding a light beam and is limited in how it can affect the beam.

Waveguides provide more flexibility in affecting light beams as additional functions may be added to the waveguides, such as isolation, filtering, amplification, wavelength selectivity, etc. However, aligning waveguides to a fiber or other waveguides or devices require an active alignment, which significantly increases the cost of manufacturing the BiDi.

Accordingly, there exists a need for a method and apparatus for passive connectivity of waveguides in an optical device. The method and apparatus should allow BiDi's to be manufactured cost efficiently. The present invention addresses such a need.

SUMMARY OF THE INVENTION

A method and apparatus for passive connectivity of waveguides in an optical device is provided in accordance with the present invention.

In an exemplary embodiment of the invention, the apparatus comprises a light source, a light detector; and a ferrule comprising at least one waveguide, where the at least one waveguide is optically coupled to the light source and the light detector.

In one aspect of the invention, the ferrule allows the waveguides to be passively aligned to other waveguides, fibers, or optical components, such as to align a first waveguide in the ferrule with a laser diode in a Bi-Directional Optical Module (BiDi). The manufacturing of the BiDi is thus more cost efficient.

In another aspect of the invention, a second waveguide in the ferrule of the BiDi is at a known and fixed distance apart from the first waveguide at an end face of the ferrule. A detector in the BiDi may be positioned so that when the first waveguide is aligned with the laser diode, the second waveguide is thereby aligned with the detector.

In another aspect of the invention, additional functions are provided with the waveguide, such as isolation, filtering, wavelength selectivity, dispersion compensation, gain flattening, amplification, etc.

In another aspect of the invention, the cost efficiency of manufacturing the BiDi is further improved by using a standard laser can, a standard ball lens, and/or other standard components, as well as a standard hermetic packaging.

Exemplary embodiments of the present invention may use one or more of the aspects described above, alone, or in combination.

BRIEF DESCRIPTION OF THE FIGURES

FIG. 4 illustrates in more detail a top view of the submount of the exemplary embodiment of the BiDi.

DETAILED DESCRIPTION

The present invention provides a method and apparatus for passive connectivity of waveguides in an optical device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a Bi-Directional optical module (BiDi) comprising waveguides packaged within a ferrule. The ferrule allows the waveguides to be passively connectorized to optical components within the BiDi and elsewhere.

To more particularly describe the features of the present invention, please refer to FIGS. 1 through 4 in conjunction with the discussion below.

Figure 1:
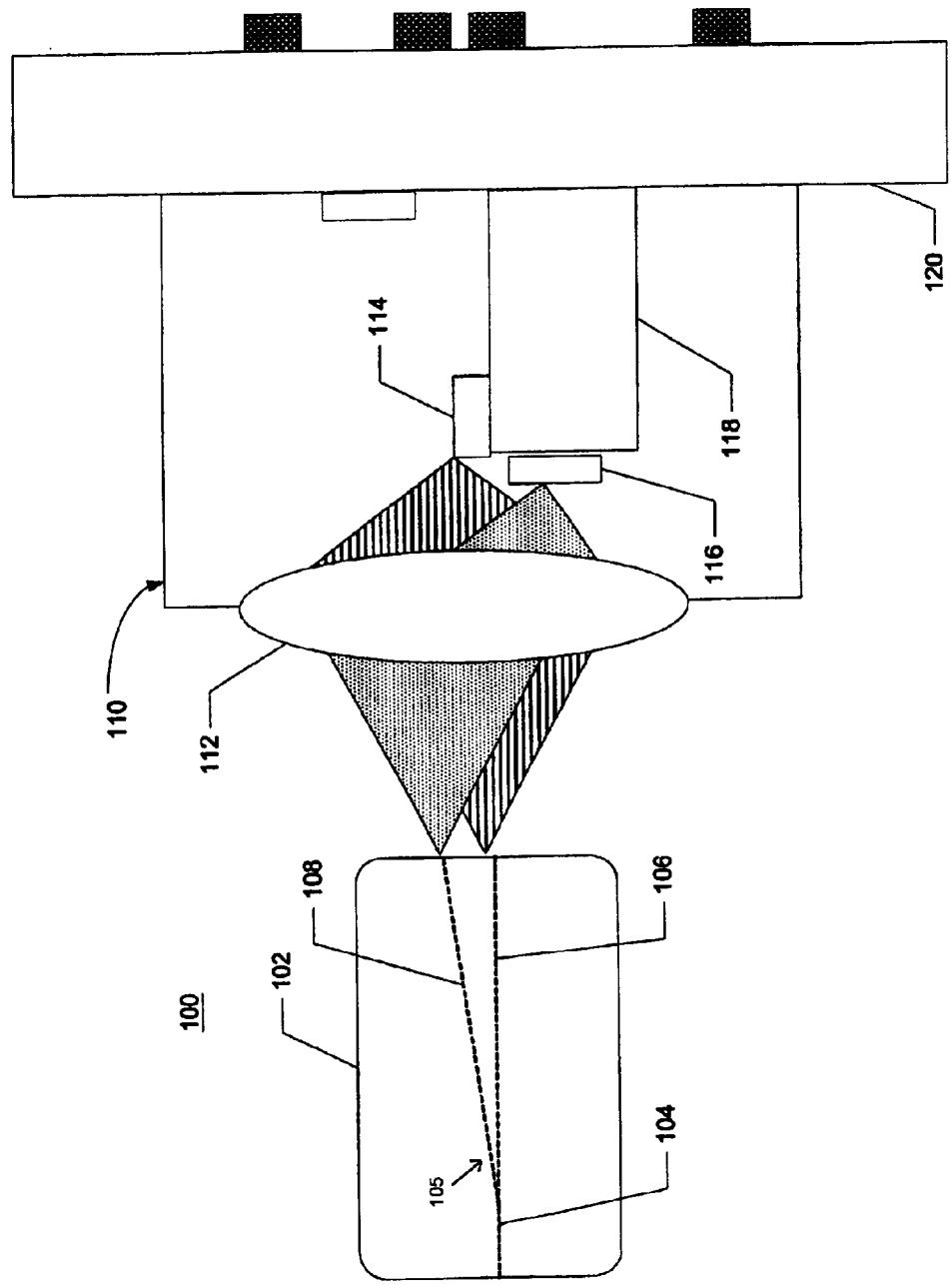
FIG. 1 illustrates a cross-sectional view of an exemplary embodiment of a BiDi with waveguides packaged within a ferrule.

FIG. 1 illustrates a cross-sectional view of an exemplary embodiment of a BiDi with waveguides packaged within a ferrule. The BiDi 100 comprises a waveguide 104 packaged in a ferrule 102. The waveguide 104 can be written into a high-precision rod or into a block of material with a high precision reference to a feature on the block. The writing can be performed using several different processes. For example, processes similar to those described in U.S. Pat. Nos. 5,656,186 or 5,271,082 may be used in combination with writing the waveguides with a high precision reference to a feature of the block of material, such as a ferrule, in accordance with the present invention.

In the exemplary embodiment illustrated in FIG. 1, the waveguide 104 is split into waveguides 106 and 108 within the ferrule 102. In another exemplary embodiment, a waveguide array is written into the block of material. In another exemplary embodiment, the waveguide(s) is not written to an end face of the block of material, but instead ends prior to the end face.

The BiDi 100 further comprises a laser can 110, which includes a laser diode 114 and a detector 116 on a submount 118. The submount 118 is coupled to a header 120. The laser can 110 also comprises a lens 112 optically coupled between the first waveguide 106 and the laser diode 114, and between the second waveguide 108 and the detector 116.

The laser diode 114 would emit a light beam, which is collimated by the lens 112. The collimated beam is transmitted to the first waveguide 106. The first waveguide 106 guides the beam to another waveguide, fiber, or to a detector in another BiDi (not shown). The second waveguide 108 guides a beam emitted from a laser diode on the other BiDi and transmits it to the lens 112. The lens 112 collimates this beam and focuses it on the detector 116. Although the ferrule 102 is illustrated with waveguides 106 and 108, any number of waveguides may be written into the ferrule 102.

Figure 2:
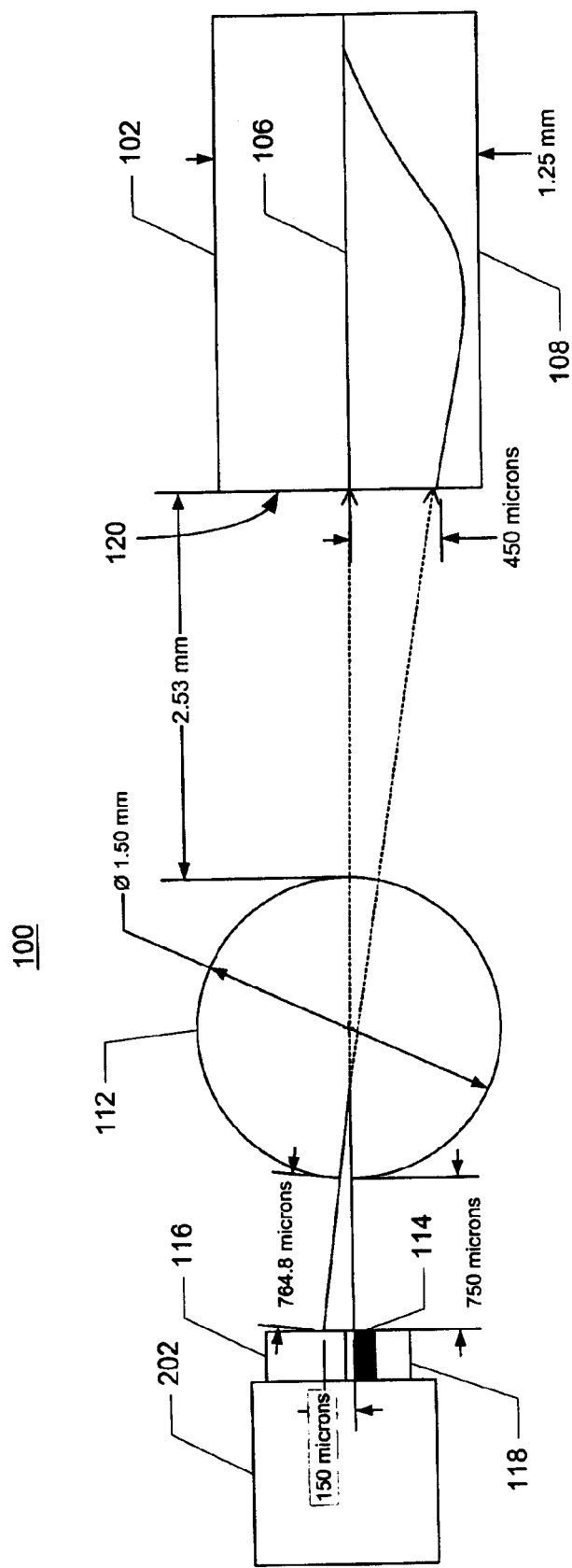
FIG. 2 illustrates in more detail the cross-sectional view of the exemplary embodiment of the BiDi with waveguides packaged in a ferrule.

FIG. 2 illustrates in more detail the cross-sectional view of the exemplary embodiment of the BiDi with waveguides packaged in a ferrule. In this exemplary embodiment, the lens 112 is a ball lens. In addition to the laser diode 114 and the detector 116, the exemplary embodiment also comprises a frame 202 to which the detector 116 is coupled. The frame 202 is further described below in conjunction with FIG. 3. The second waveguide 108 in the ferrule 102 curves toward the first waveguide 106 as illustrated so that the light beam guided by the second waveguide 108 traverses through the clear aperture of the ball lens 112 as much as possible. The distance between the first waveguide 106 and the second waveguide 108 at the end face 120 of the ferrule 102 is known and fixed.

Because the waveguides 106 and 108 are used within the ferrule 102, certain functionality may be provided by the waveguides 106 and 108. For example, one or more of the waveguides 106 and 108 may include an isolator, a filter, a diffraction grating, a dispersion compensator, or a gain flattener 105 (FIG. 1). The waveguides 106 and 108 may be wavelength selective. For example, the first waveguide 106 may transmit a beam with a wavelength of 1550 nm away from the BiDi 100 while the second waveguide 108 may transmit a beam of a wavelength of 1310 nm, emitted by another BiDi (not shown), to the BiDi 100. The ferrule 102 may be doped so that the light beams guided by the waveguides 106 and 108 are amplified as they traverse through the ferrule 102. For example, the laser diode 114 may be a pump laser, such that on the return path to the detector 116, via the second waveguide 108, an internal C signal is amplified.

The packaging of the waveguide 106 and 108 in the ferrule 102 allows ease in aligning the waveguides 106 and 108 to the laser diode 114 and the detector 116, respectively. The ferrule 102 keeps the waveguides 106 and 108 accurately aligned within a connector (not shown). The connector can be coupled to a housing (not shown) that contains the laser can 110. When the connector with the ferrule 102 and waveguides 106–108 is coupled to the housing, the first waveguide 106 is passively aligned to the laser diode 114. Because the distance between the first waveguide 106 and the second waveguide 108 at the end face 120 of the ferrule 102 is known and fixed, the detector 116 may be placed such that once the first waveguide 106 is aligned to the laser diode 114, the second waveguide 108 is automatically aligned to the detector 116 as well. In this manner, the BiDi 100 is passively aligned with a single process.

In this exemplary embodiment, the distance from the ball lens 112 to the detector 116 is approximately 764.8 microns. The distance from the laser diode 114 to the lens 112 is approximately 750 microns. The ball lens 112 is approximately 1.50 mm in diameter. The distance from the ball lens 112 to the end face 120 of the ferrule 102 is approximately 2.53 mm. The width of the ferrule 102 is approximately 1.25 mm. The distance between the waveguides 106 and 108 at the end face 120 of the ferrule 102 is approximately 450 microns. These dimensions are exemplary and approximate. Other dimensions are possible.

Figure 3:
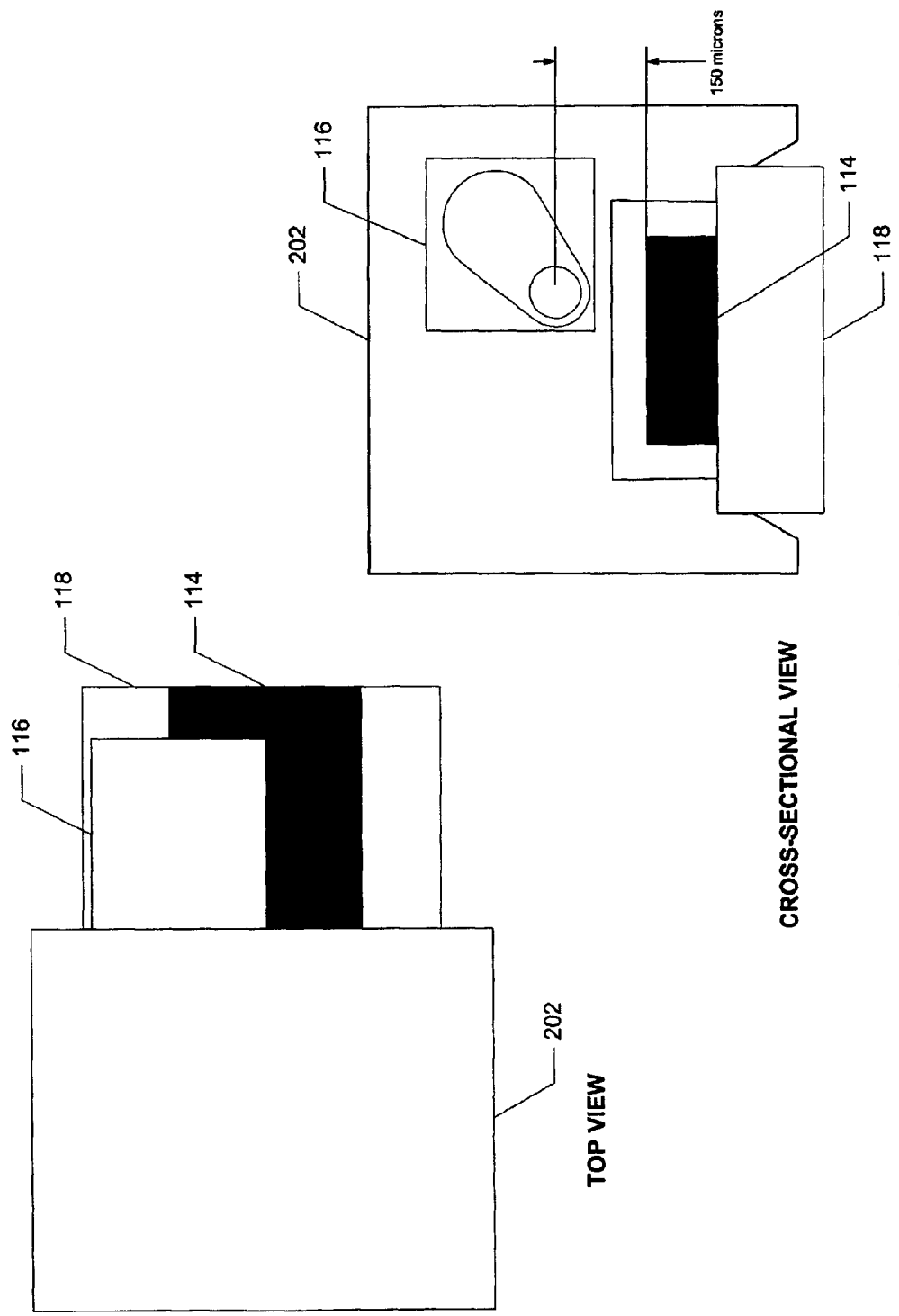
FIG. 3 illustrates in more detail a top and cross-sectional view of the laser diode, detector, and submount assembly of the exemplary embodiment of the BiDi.

FIG. 3 illustrates in more detail a top and cross-sectional view of the laser diode, detector, and submount assembly of the exemplary embodiment of the BiDi. The laser diode 114 is mounted onto the submount 118. Surrounding the laser/submount assembly is the frame 202. In the exemplary embodiment, the frame 202 covers a portion of the laser/submount assembly, leaving the rest uncovered. The detector 116 is coupled to the frame 202, such that the detector 116 is of a specific distance away from the laser diode 114. The specific distance depends upon the focal length of the lens 112 and should be such that the laser diode 114 and the detector 116 are properly optically coupled to the waveguides 106 and 108, respectively. For the exemplary dimensions illustrated in FIG. 2, the distance between the laser diode 114 and the detector 116 is approximately 150 microns. Although the exemplary embodiment of the BiDi uses the frame 202 to maintain the specific distance between the laser diode 114 and the detector 116, other ways of maintaining this distance is possible.

FIG. 4 illustrates in more detail a top view of the submount of the exemplary embodiment of the BiDi. The submount 118 comprises a surface 402 onto which the laser diode 114 is mounted, such as with solder. Proximate to the surface 402 are lines 404. The lines 404 isolate the area of the surface 402 on which the laser diode 114 sits during reflow of the solder in subsequent steps in manufacturing the BiDi 100, avoiding contamination.

In this exemplary embodiment, the submount 118 has a length of approximately 3.88 mm. a width of approximately 2.48 mm, and a height of approximately 0.63 mm. The lines 404 has a length of 2.36 mm as it runs along the length of the submount 118, and a length of 0.38 mm as it runs along the width of the submount 118. The width of the lines 404 is approximately 0.12 mm to 0.14 mm.

Although the exemplary embodiment of the present invention comprises one laser diode and one detector, the BiDi 100 may also comprise two laser diodes or two detectors. The laser diode 114 may be single- or multi-mode laser. Although the exemplary embodiment is described as a two port BiDi, a three port BiDi with one laser diode and two detectors, or two laser diodes and one detector, may also be provided with the waveguides packaged in a ferrule.

A packaged waveguide for passive connectivity has been disclosed. In the exemplary embodiment, the waveguides are packaged in a ferrule. The ferrule allows the waveguides to be passively aligned to other waveguides, fibers, or optical components, such as to align a first waveguide in the ferrule with a laser diode in a BiDi. In the exemplary embodiment, a second waveguide in the ferrule the BiDi is at a known and fixed distance apart from the first waveguide at an end face of the ferrule. A detector in the BiDi may be positioned so that when the first waveguide is aligned with the laser diode, the second waveguide is also aligned with the detector. Additional functions can be provided with the waveguide, such as isolation, filtering, wavelength selectivity, dispersion compensation, gain flattening, amplification, etc. The manufacturing of the BiDi with the waveguides packaged in the ferrule is cost efficient to manufacturer since alignment and connectivity is achieved passively. The cost efficiency can be further improved by using a standard laser can, a standard ball lens, and/or other standard components, as well as a standard hermetic packaging.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus, comprising:

a light source;

a light detector; and a ferrule packaging a plurality of waveguides written into a block of a material, a first waveguide having a first end coupled to a first location on a first end face of the block for receiving light from the light source and a second end coupled to a location on the second end face of the block for transmitting light received from the light source away from the block and to an external destination, and a second waveguide having a first end coupled to a second location on the first end face of the block for coupling light received from the second waveguide to the light detector, the second waveguide having a second end coupled to the location on the second end face of the block for receiving a light signal from an external source for detection by the light detector.

2. The apparatus of claim 1, wherein the second waveguide curves toward the first waveguide at a location proximate to the first end face of the block.

3. The apparatus of claim 2, wherein a distance between the first and second waveguides at the first end face of the block is fixed.

4. The apparatus of claim 1, wherein one or more of the plurality of waveguides comprise at least one of:

an isolator;

a filter;

a diffraction grating;

a dispersion compensator; and a gain flattener.

5. The apparatus of claim 1, further comprising a laser can, wherein the laser can comprises the light source and the light detector.

6. The apparatus of claim 5, wherein the laser can further comprises:

a submount, wherein the light source is coupled to the submount; and a frame, wherein the light detector is coupled to the frame, wherein the frame fixedly positions the light detector at a desired distance from the light source.

7. The apparatus of claim 6, wherein the submount further comprises:

a surface, wherein the light source is coupled to the submount on the surface; and lines, wherein the lines isolate the surface during reflow of solder.

8. The apparatus of claim 1, further comprising a lens optically coupled between the plurality of waveguides and the light source and the light detector.

9. The apparatus of claim 8, wherein the lens comprises a ball lens.

* * * * *